United States Patent
Rappoport et al.

(10) Patent No.: US 6,601,161 B2
(45) Date of Patent: *Jul. 29, 2003

(54) METHOD AND SYSTEM FOR BRANCH TARGET PREDICTION USING PATH INFORMATION

(75) Inventors: Lihu Rappoport, Haifa (IL); Ronny Ronen, Haifa (IL); Nicolas Kacevas, Haifa (IL); Oded Lempel, Haifa (IL)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,303

(22) Filed: Dec. 30, 1998

(65) Prior Publication Data

US 2003/0041230 A1 Feb. 27, 2003

(51) Int. Cl.[7] .................................................. G06F 9/38
(52) U.S. Cl. ...................................... 712/238; 712/239
(58) Field of Search ............................... 712/234, 239, 712/240, 238

(56) References Cited

U.S. PATENT DOCUMENTS

| | | |
|---|---|---|
| 5,442,756 A | 8/1995 | Grochowski et al. |
| 5,574,871 A | 11/1996 | Hoyt et al. |
| 5,577,217 A | 11/1996 | Hoyt et al. |
| 5,584,001 A | 12/1996 | Hoyt et al. |
| 5,687,360 A | 11/1997 | Chang |
| 5,706,492 A | 1/1998 | Hoyt et al. |
| 6,374,349 B1 | 4/2002 | McFarling ................. 712/239 |

OTHER PUBLICATIONS

Driesen et al., "The Cascaded Predictor; Economical and Adaptive Branch Target Prediction", *Proceedings of the 31st Annual ACM/IEEE International Symposium on Microarchitecture,* pp. 249–258, Nov. 30–Dec. 2, 1998.*

Stark et al., "Varludle Length Path Branch Prediction", *Proceedings of the 8th International Conference on Architectural Support for Programming Languages and Operating Systems,* ACM, pp. 170–179.*

Chang et al., "Branch Classification: a New Mechanism for Improving Branch Predictor Performance," *MICRO–27 Proceedings of the 27th Annual Int'l Symposium on Microarchitecture,* Nov. 30–Dec. 2, 1994, pp. 22–31.

Calder et al., "Reducing Indirect Function Call Overhead in C++ Programs," *POPL'94: 21st ACM SIGPLAN–SIGACT Symposium on Principles of Programming Languages,* Jan. 17–21, 1994, pp. 397–408.

Chang et al. "Target Prediction for Indirect Jumps," *The 24th Annual Int'l Symposium on Computer Architecture,* ACM, Jun. 2–4, 1994, pp. 274–283.

(List continued on next page.)

Primary Examiner—William M. Treat
(74) Attorney, Agent, or Firm—Kenyon & Kenyon

(57) ABSTRACT

A system and method for predicting a branch target for a current instruction in a microprocessor, the system comprising a cache storing indirect branch instructions and a path register. The path register is updated on certain branches by an XOR operation on the path register and the branch instruction, followed by the addition of one or more bits to the register. The cache is indexed by performing an operation on a portion of the current instruction address and the path register; the entry returned, if any, may be used to predict the target of the current instruction.

24 Claims, 5 Drawing Sheets

OTHER PUBLICATIONS

Calder et al., "Fast and Accurate Instruction Fetch and Branch Prediction," *The 21st Annual Int'l Symposium of Computer Architecture,* ACM SIGARCH and IEEE Computer Society Tech. Comm. On Computer Architecture, Apr. 18–21, 1994, pp. 2–11.

Brad Calder and Dirk Grunwald, "Reduciing Indirect Function Call Overhead in C== Programs," *ACM Press, Conference Record of POPL '9a4: 21$^{st}$ ACM Sigplan–Sigact Symposium on Principles of Programming Languages,* (Jan. 17–21, 1994) Portland, Oregon, pp. 397–408.

Po–Yung Chang, Eric Hao and Yale N. Patt, "Target Prediction for Indirect Jumps," *The 24$^{th}$ Annual International Symposium on Computer Architecture,* (Jun. 2–4, 1997) Denver, Colorado, 274–283.

* cited by examiner

METHOD AND SYSTEM FOR BRANCH TARGET PREDICTION USING PATH INFORMATION

BACKGROUND OF THE INVENTION

I. Field of the Invention

The present invention relates to the field of computer systems. More specifically, the present invention relates to microprocessors, in particular to the prediction of branch instructions.

II. Background Information

Microprocessors (or "processors") execute a series of program instructions, each instruction having an address. Typically instructions are executed in sequence, with branch instructions causing out of sequence execution by causing the processor to branch to an instruction. Pipelined processors generally process instructions in a sequence of stages, such as fetch, decode, execute, and retire, forming a pipeline. Different aspects of different instructions are processed at the same time by different stages forming the pipeline. While one instruction is being fetched from memory, another is being decoded, another is being executed, etc.

When it is known whether or not an instruction being processed in the pipeline will cause a branch, and to what address the instruction will cause a branch (the "branch target"), the branch is resolved. Branch instructions typically are not resolved until after the execution stage. When a branch is resolved, if the fetch unit has not fetched the proper branch target, the instructions fetched and placed in the pipeline subsequent to that branch instruction must be flushed, i.e. removed, from the pipeline. Thus, a certain amount of processing effort, taking a certain amount of time, is wasted. In order for a pipelined processor to operate efficiently, the instruction fetch unit at the head of the pipeline must continually provide the pipeline with instructions to process. If it can be determined with reasonable accuracy, soon after an instruction is fetched, whether or not the instruction will cause a branch, and to what address the instruction will cause a branch, such inefficiencies can be avoided. If, when a branch instruction is fetched, instead of fetching the instruction subsequent to a branch instruction or a predicted target address, no fetch occurs, the processor stalls and a "bubble" is created. The delay in fetching the next instruction will cause each stage of the pipeline to be idle for a period of time.

Mechanisms exist in processors for using the address of an instruction to predict if an instruction is likely to be a branch, and if so, the likely outcome, early in the pipeline sequence. These mechanisms take a portion of the instruction address, possibly in combination with a representation of the history of the recent state of the processor, and use this to access a table. A table may be implemented in any number of manners; for example in a cache, buffer or memory, or by other methods. Entries in the table provide information such as whether or not the instruction is likely to be a branch, the likely target address for the branch, and whether or not the branch will be taken. If the instruction is predicted to be a taken branch the likely target address can be provided to the fetch unit, which fetches the instruction and, if the prediction is correct, prevents a stall. If the prediction is incorrect a stall will occur; thus branch prediction mechanisms are only worthwhile if they predict target addresses with some amount of accuracy. Branch prediction mechanisms are costly in terms of processor resources. The more resources devoted to a branch prediction mechanism, the more accurate the mechanism can be.

Branches may be classified based on two independent characterizations. A branch instruction may be conditional or unconditional, and may be direct or indirect. An unconditional branch instruction always causes a branch. A conditional branch instruction-either branches to a target address or continues to the instruction following the branch instruction ("falls through") depending on a condition (e.g., the non-zero status of an operand). A direct branch always branches to the same target (if the branch is taken), whereas the target of an indirect branch is determined after some calculation and is thus not known until the branch instruction is executed.

Branch prediction mechanisms may be caches containing as entries predicted branch targets. Such mechanisms may be formed from set associative caches, which store information in a plurality of lines, each line having a plurality of entries called ways. Each way is indexed by an associated tag. An n-way set associative cache has n ways per line. An index and tag are used to access an entry. The index accesses a line in the cache. The tag is then matched to one of the n tags in the line. If a tag matches a "hit"results and the entry corresponding to the tag is returned; otherwise a "miss" occurs and no result is returned.

A branch target buffer ("BTB") is a cache containing as its entries branch prediction information. A BTB may contain combine branch information on whether or not branches are predicted to be taken with information on predicted targets; other systems may use separate buffers for such sets of information. BTBs can be implemented in various ways. In one known implementation a BTB is a set associative cache. Each way stores a predicted target address, a taken/not taken prediction, and information on the predicted type of branch (e.g., direct or indirect). The BTB is indented by a portion of the address of the instruction for which a branch prediction is desired (the "branch address"), and the tag is formed another portion of the branch address. When used herein, "branch address" may refer to the addresses of actual branch instructions as well as to those of instructions where it is not known whether or not the instruction is a branch, but for which a prediction is desired.

Other known implementations may index a BTB by the result of an exclusive- or ("XOR") operation on a portion of the instruction address and a path history register. The XOR operation (represented herein by "$\oplus$") produces a 0 if both of its inputs are either 1 or 0 and produces a 1 if one input is 1 and the other is 0. History registers and path history registers are registers containing, in some form, the history of the last several branches. A history register records information on whether or not branches were taken. For example, entries in a history register may be 1 for a branch that is taken and 0 for a branch that is not taken. A path history register records information on the addresses of branch instructions or targets and information on whether or not branches were taken. A history register may be global (recording history for all branches) or may be particular to each of a number of branch addresses for which a prediction is desired.

In one existing branch prediction method, a target cache contains target addresses of indirect branch targets. The cache is indexed by a calculation involving a branch address and a register. The register is formed by shifting into the register a small number of bits from the target address of previous branches. In such a scheme a BTB may be accessed in parallel with the target cache to determine the type of branch—i.e., indirect, conditional, or other types.

One known prediction method uses a path information register ("PIR") recording information on conditional direct branches only. The PIR is formed by XORing the PIR itself with a number of bits from the address of the target of the current conditional direct branch instruction, shifting the result left one bit, and adding as the rightmost bit an indication of the branch outcome (taken or not taken). The PIR is used to index a BTB storing binary predictions (taken or not taken) for conditional direct branches.

A tradeoff occurs between devoting resources to branch prediction mechanisms and their accuracy. It is costly to implement branch prediction mechanisms. However, the less resources devoted to such mechanisms the less accurate they are. Branch prediction accuracy suffers when less information is stored as branch history, less information is used to index prediction tables and less information is stored in prediction tables. It is desirable to have an accurate yet efficient method to provide branch prediction for indirect branches. Furthermore, branch prediction methods which are accurate and efficient for and appropriate for conditional branches may not be accurate and efficient for and appropriate for indirect branches. It is desirable to have a branch prediction mechanism that is efficient and accurate for a indirect branches as well as direct branches.

SUMMARY OF THE INVENTION

A system and method for predicting a branch target for a current instruction in a microprocessor, the system comprising a cache storing indirect branch instructions and a path register. The path register is updated on certain branches by an XOR operation on the path register and the branch instruction, followed by the addition of one or more bits to the register. The cache is indexed by performing an operation on a portion of the current instruction address and the path register; the entry returned, if any, may be used to predict the target of the current instruction.

DETAILED DESCRIPTION

I. Overview

Figure 1:
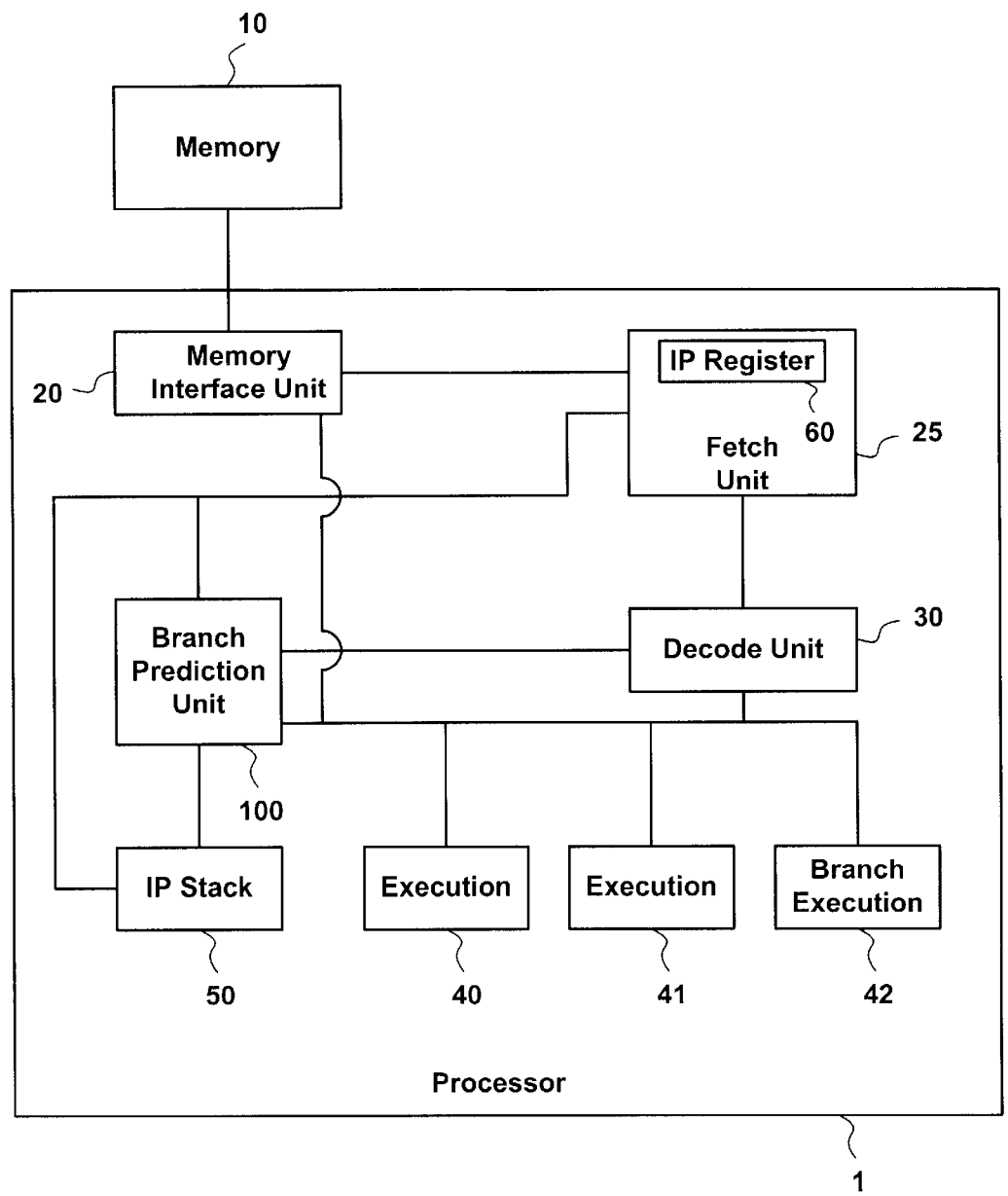
FIG. 1 is a block diagram illustrating a computer processor according to an embodiment of the present invention.

The system and method of the present invention allow for more accurate branch target prediction using a minimum of system resources. In an exemplary embodiment of the present invention, a branch prediction unit provides branch target predictions based on the instruction pointer ("IP") of a branch instruction. The branch prediction unit comprises a BTB, an indirect target buffer ("ITB") and a PIR. The BTB and ITB store predicted target addresses and the PIR stores path history. The PIR is used, in combination with a branch address, to index the ITB. On each instruction fetch both the BTB and ITB are accessed in parallel, and, if either hit, the provided target or targets may be used to predict the target of a branch address.

The PIR provides an efficient way to accurately record the path history. When combined with a portion of the branch address to form an index for the ITB, the PIR allows for different predictions to be made for the same indirect branch instruction, depending on varying processor states. Since the target address of a particular indirect branch instruction may change each time the instruction is executed, multiple target entries for indirect branch instructions are kept in the ITB; the PIR allows for these different entries to be distinguished. In an exemplary embodiment the PIR is designed to store a maximum amount of information in a small amount of space, and to give more weight to recent branches.

The BTB used in an exemplary embodiment of the present invention is of a structure known in the art. The BTB is a four-way set associative cache, where each way has a 9-bit tag. The BTB is indexed by the 9 least significant bits ("LSB") of the branch address. The 9 next higher bits of the branch address are matched with a tag associated with one of the ways in the line.

In an exemplary embodiment the ITB of the present invention is a four way set associative cache indexed by the combination of the contents of the PIR and the branch address of the instruction for which a prediction is desired. Depending on which of the BTB and ITB miss or hit, and on what kind of branch the BTB predicts, either a prediction provided by the BTB or one provided by the ITB may provide a predicted branch target address. Alternate embodiments may use different structures for the ITB, and BTB. The interaction between the BTB and ITB described by the system and method of the present invention allows the predictive power of the ITB to be used only when necessary and efficient.

In an exemplary embodiment the BTB and ITB caches are static RAMs ("SRAMs"). However, it should be noted that when used herein a cache may be any memory device or portion of a memory device. Furthermore, while an embodiment of the present invention uses an ITB in combination with a specific type of BTB, the ITB in conjunction with the PIR may be combined with any sort of prediction cache or mechanism, or may be used without a BTB or other prediction cache.

To index the ITB for a branch prediction the 16-bit PIR is XORed with the 16 LSB of the branch address to produce a value. The 7 LSB of the value index a line of the cache. The 9 most significant bits ("MSB") are used to match a tag associated with one of the four ways in the line; if the tag matches, the way holds a possible branch target. Alternate embodiments may use different methods and systems of indexing the ITB. Such methods and systems may include PIRs having different structures.

The ITB typically stores multiple entries for each branch, while the BTB stores one entry per branch; thus for each branch the use of the BTB is less expensive than the use of the ITB. Since the indexing method used with the BTB is taken directly from the branch instruction IP and not combined with the PIR, and uses more information from the IP than the ITB indexing method, it is more likely that a BTB hit corresponds to the instruction for which a prediction is desired. Thus the BTB records predicted branch types and is used as a "gatekeeper". The BTB indicates whether an ITB entry is likely to be an indirect branch, and allows only branches predicted to be indirect are added to the ITB.

In operation, when an indirect branch instruction is to be added to the branch prediction unit, it is first added to the BTB. If it is later determined the BTB entry does not provide an adequate prediction, an entry may be allocated in the ITB, which provides a more accurate prediction for some indirect branch instructions. For some branch instructions the BTB may provide an adequate branch prediction. Since the BTB is less costly, on a per-branch basis, to implement, such instructions are not placed in the ITB. Using the BTB and ITB together in this manner, where the ITB is used only if it provides a better prediction, raises the efficiency of the branch prediction unit of the present invention while providing high predictive accuracy.

When used herein, to describe an embodiment of the present invention, an indirect branch refers to a branch which is unconditional (i.e., must be taken) and where the target is not known until the branch executes. Furthermore, when used herein to describe an embodiment of the present invention, a direct branch refers to a branch where the target is known before the branch executes, regardless of whether the branch is conditional. Direct branches include branches that are non-conditional, i.e., must be taken, and which are direct, i.e., which have set targets. However, it should be appreciated that the system and method of the present invention may be used with other types of branches, such as branches which are at the same time indirect and conditional.

II. Structure

Referring to the figures in which like numerals indicate like elements, FIG. 1 is a block diagram illustrating a computer processor 1 according to an embodiment of the present invention. Computer processor 1 interfaces with a memory 10, providing non-permanent storage of data and program instructions, a memory interface unit 20 transferring data and instructions between memory 10 and processor 1, a fetch unit 25, obtaining particular instructions from memory interface unit 20, a decode unit 30, determining the type of instruction and dividing the instruction into one or more micro-operations ("micro-ops"), execution units 40–42, executing micro-ops, an IP stack 50, storing IP addresses of instructions for which a branch is predicted, and a branch prediction unit 100, providing predictions of the target addresses of branch instructions. The various components of processor 1 communicate with each other and with memory 10 via various internal busses and lines, not labeled. Fetch unit 25 maintains the current IP in IP register 60, a 32 bit register. While in an exemplary embodiment the branch prediction unit is a distinct unit implemented in hardware, it should be appreciated that alternate embodiments may involve other implementations of the branch prediction unit. For example, the functions of the branch prediction unit may be distributed among different units within a processor.

When processor 1 attempts to load or store an item of information via memory interface unit 20, memory interface unit 20 may first attempt to load from or store to a cache (not shown), included within memory interface unit 20. If the item of information is not in the cache, memory interface unit 20 accesses memory 10. Execution units 40–42 include branch execution unit 42, executing micro-ops of branch instructions, and may include, for example, an add execution unit.

In an exemplary embodiment, each instruction is 32 bits in length. Processor 1 has a 32 bit instruction address space. IP register 60 is a 32 bit register and may refer to any of $2^{32}$ instructions.

Fetch unit 25 uses the IP stored in IP register 60 to determine which instruction to fetch next. If no branch instruction occurs, the IP in IP register 60 is incremented after each instruction fetch. A branch instruction (or a prediction that a branch will occur as a result of an instruction) causes the IP to be altered in a non-sequential manner, and thus causes fetch unit 25 to fetch out of sequence. The one or more micro-ops corresponding to a program instruction cause computer processor 1 to perform the operation of that instruction.

When a branch prediction is provided by branch prediction unit 100, fetch unit 25 fetches the predicted target, which enters the pipeline, and the IP in IP register 60 is altered. The IP of the instruction for which a prediction was provided is stored in IP stack 50. If it is later determined that an instruction predicted to be a branch which is taken was not ill fact a taken branch, or was not in fact a branch at all, the IP of the instruction for which this misprediction was made is taken off IP stack 50, incremented, and placed in IP register 60. The pipeline is also flushed—the mispredicted target and any instructions that followed it into the pipeline are removed from the pipeline stages processing the instructions, along with any associated data.

IP stack 50 is a last-in-first-out ("LIFO") stack: entries are removed from the stack ("popped of") in an order opposite from which they are placed on the stack. A stack is used to store IP addresses, as multiple non-executed, un-retired instructions for which branches are predicted may be in various stages of the pipeline at the same time.

A misprediction may occur in a number of ways: an instruction predicted to be a branch may not in fact be a branch; an instruction predicted to be a taken branch is not in fact taken (or vice versa); and a branch target address may be wrong. For some instructions, a misprediction may be known as early as the decode stage.

When an instruction which is predicted to be a branch which will be taken is executed and actually causes a branch, the IP address corresponding to that instruction is popped off IP stack 50 and discarded. This happens regardless of whether the target prediction is correct. Mispredictions which successfully predict that a branch will occur but mispredict the target do not result in an IP being transferred from IP stack 50 to IP register 60 in fetch unit 25, as the IP of the fetch unit 25 is corrected by the target address produced by branch execution unit 42. When an instruction which is predicted to be a branch which will be taken is executed and does not cause a branch or is not in fact a branch instruction, the IP address corresponding to that instruction is popped off IP stack 50, and an IP resulting from the increment of this value is used as the current IP. In this manner the processor state is returned to that which would have resulted from the correct processing of the mispredicted instruction; fetch unit 25 fetches the instruction subsequent to the mispredicted instruction. A fall through occurs when a conditional branch is not taken; the instruction subsequent to the branch instruction, the fall through instruction, is executed.

Figure 2:
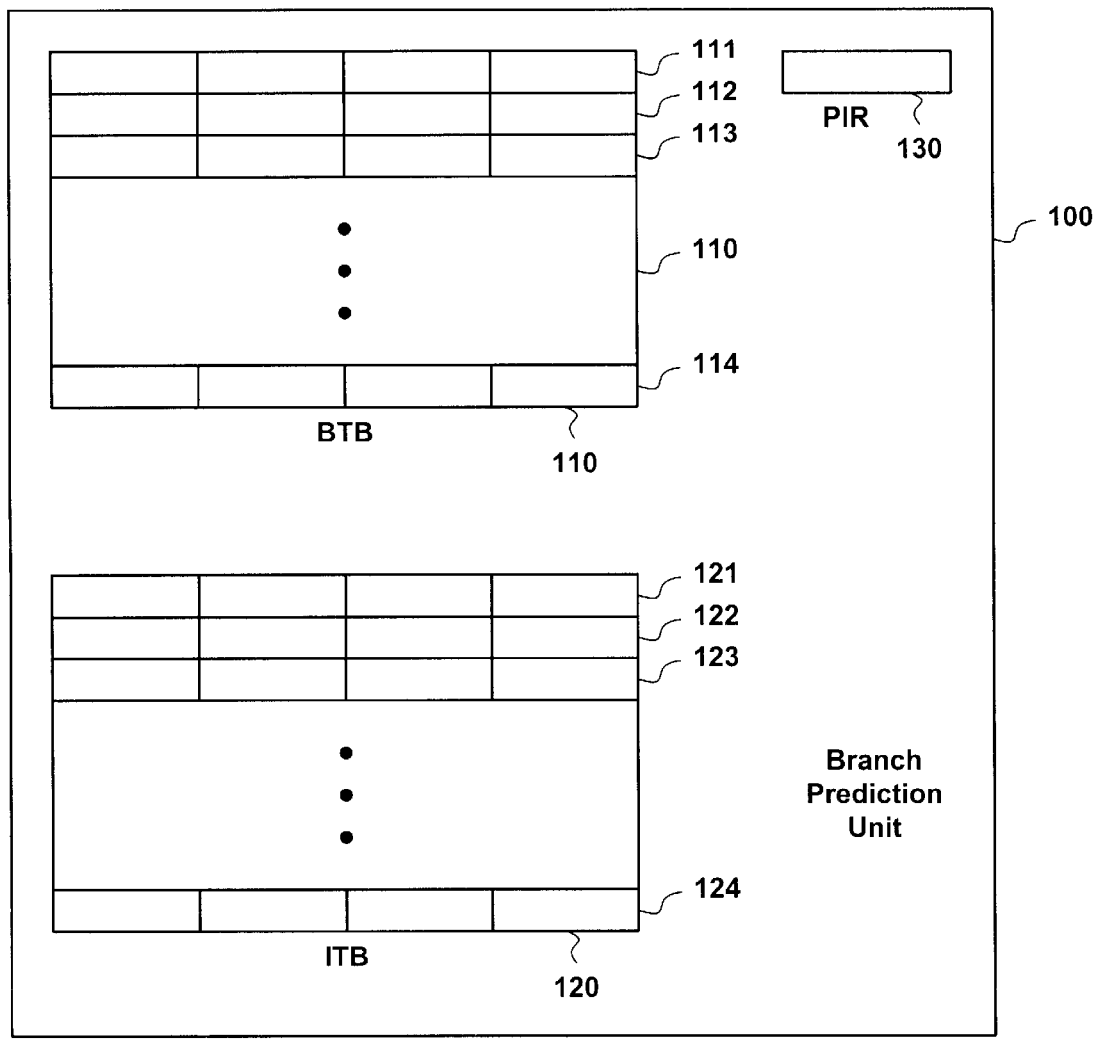
FIG. 2 is a block diagram illustrating the branch prediction unit of FIG. 1 according to an embodiment of the present invention.

FIG. 2 is a block diagram illustrating branch prediction unit 100 of FIG. 1 according to an embodiment of the present invention. Branch prediction unit 100 accepts instruction addresses and, for some addresses, provides a prediction of the instruction type, whether or not a branch will be taken, and the address to which the instruction will cause a branch. Branch prediction unit 100 comprises a BTB 110, for providing predictions and for storing information such as the probable type of a branch, an ITB 120, for providing predictions for indirect branches, and a PIR 130, for forming an index for ITB 120.

Branch prediction unit 100 includes ITB 120, a four way set associative cache having 128 lines (for clarity, only a small number of the lines are shown, labeled 121–124) for storing indirect branch prediction information. A seven bit ITB index and nine bit tag is obtained from a calculation involving the branch address and the contents of PIR 130. ITB 120 is an SRAM. In an exemplary embodiment ITB 120 provides target predictions for indirect branches.

Figure 3:
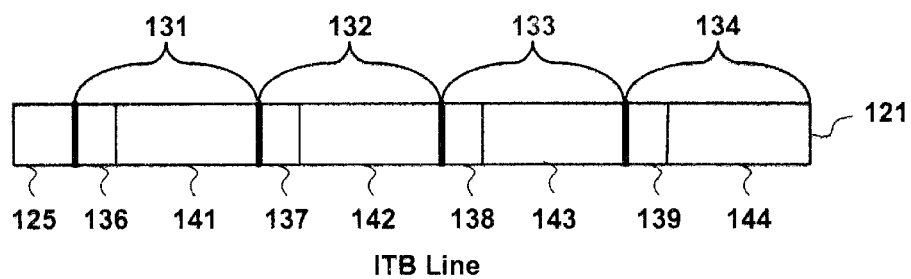
FIG. 3 is a block diagram illustrating a line of the ITB of FIG. 2 according to an embodiment of the present invention.

FIG. 3 is a block diagram illustrating line 121 of ITB 120 of FIG. 2 according to an embodiment of the present invention. Each line 121–124 in ITB 120 has four ways 131–134, each way providing a prediction for an indirect branch instruction. Each of the ways 131–134 in ITB line 121 has a 9 bit tag 136–139, for providing a more accurate indication that a branch instruction address matches the way and a 32 bit target address 141–144, for providing a predicted target address for a branch instruction. The target address for a way is the address to which the instruction is predicted to cause a branch. ITB line 121 has a 5 bit least recently used ("LRU") counter 125 for recording the order in which each of the four ways 131–134 has been accessed. When a new way is to be added to an ITB line (i.e., allocated or created), it must replace an existing entry, the entry which has not been used as recently as the other three entries,;. Thus LRU counter 125 is used to determine which way to evicted; the least recently used way. LRU counter 125 is set so that a new entry is considered the most recently used way. Other structures, arrangements of data and data formats may be used for the ITB.

Other methods for determining which cache entry should be evicted on the addition of a new entry may be used. For example, such methods may have an LRU counter associated with each way instead of with the multiple ways on a line.

ITB 120 is indexed by a combination of the branch address and PIR 130 (FIG. 2), a sixteen bit register storing global path history information. Path history information is some representation of the sequence of branches—out of sequence executions—taken by a program during execution. That the history is global indicates that it applies to all branches for which a prediction is made; this can be contrasted with methods recording different sets of history information for each of numerous possible branch addresses. PIR 130 is set to an initial value of all zeros and is recomputed on the occurrence of each direct and indirect branch. In an exemplary embodiment, to recompute PIR 130, the PIR is XORed with a portion of the branch address, if the branch was direct, or a portion of the target address, if the branch was indirect; the result is shifted left one bit, and a one bit taken/not taken code is added to the least significant bit.

Branch prediction unit 100 includes BTB 110, a four way set associative cache having 512 lines (for clarity, only a small number of the lines are shown, labeled 111–114) for storing branch prediction information. BTB 110 is indexed by the nine LSB of the branch address. BTB 110 is an SRAM; however, it should be noted that BTB 110 or ITB 120 may be implemented as any cache or storage structure.

In an exemplary embodiment BTB 110 provides target predictions for both indirect and direct branches.

Figure 4:
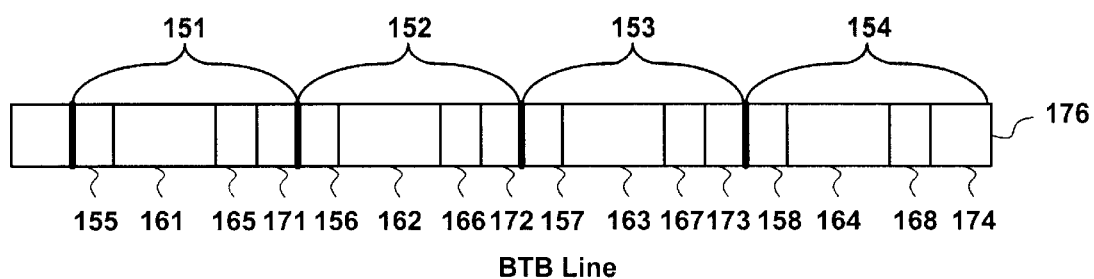
FIG. 4 is a block diagram illustrating a line of the BTB of FIG. 2 according to an embodiment of the present invention.

FIG. 4 is a block diagram illustrating line 111 of BTB 110 of FIG. 2 according to an embodiment of the present invetnion. Line 111 in BTB 110 has four ways 151-154, each way providing a prediction for a branch instruction. Each of the ways 151–154 in BTB 110 line 111 has a 9 bit tag 155–158, for providing a more accurate indication that a branch instruction address matches that way, a 32 bit target address 161–164, for providing a predicted branch target, a two bit branch type field 165–168, for indicating the type of branch, and a two bit history field 171–174, for predicting whether or not a conditional branch will be taken. BTB line 111 has a 5 bit LRU counter 176 (similar to LRU counter 125 used with ITB 120, FIG. 3) for recording the order in which each of the four ways 151–154 has been accessed and for evicting entries. The target address for a way is the address to which the instruction is predicted to cause, a branch, if the branch is taken.

In an exemplary embodiment, the history field is a two bit saturated counter which is incremented each time the corresponding branch is taken and decremented each time the corresponding branch is not taken. A saturated counter is a counter which, when incremented or decremented beyond its upper or lower limit, remains at that limit. If the history field is in the lower two states it is interpreted to predict the corresponding branch will not be taken; if the field is in the upper two states the prediction is taken. The branch type field is a two bit code indicating whether the branch is conditional or unconditional and whether the branch is direct or indirect. Other structures, ;arrangements of data and data formats may be used for the BTB. For example, the history field or branch type field may be individual bits.

III. Operation

In an exemplary embodiment of the system and method of the present invention, instructions are processed by the pipeline formed fetch unit 25, decode unit 30 and execution units 40–42. An instruction is fetched from memory 10 (or a cache) via memory interface unit 20. While the instruction is being fetched branch prediction unit 100 may return a prediction; branch prediction unit 100 accesses BTB 110 and ITB 120 and an entry from one of BTB 100 or ITB 120 may be used as a prediction.

BTB 110 is indexed by the 9 LSB of the instruction address; the next 9 higher bits provide a tag. A BTB hit occurs (and BTB 110 provides a prediction) if the line corresponding to the 9 LSB contains a tag corresponding to the next 9 higher bits; otherwise a BTB miss occurs and no BTB prediction is provided.

To access a target address in ITB 120, an index is calculated from PIR 130 and the branch address (the address for which a prediction is desired, which may not in fact be that of a branch instruction). PIR 130 is XORed with the 16 LSB of the branch address. The 7 LSB of the result are used as an index to one of the 128 lines in ITB 120. The 9 MSB are used as a tag which is compared with each of the tags in the four ways of the line indexed. If the upper 9 bits match one of the four tags in the line an ITB hit occurs and the target address corresponding to the tag provides the result. If the upper 9 bits of the result match none of the four tags a miss occurs and no result is provided. Alternate embodiments may use different methods to access the ITB and BTB; for example, different combinations of IP bits may used to index these buffers.

When a branch address is sent to branch prediction unit 100 both BTB 110 and ITB 120 may hit or miss. There are four possible outcomes: BTB hit/ITB miss, BTB hit/ITB hit, BTB miss/ITB hit, and BTB miss/ITB miss. Depending on which combination of BTB/ITB hit/miss occurs, what the predicted type of the branch is, and whether the branch is predicted to be taken, one of the results from the BTB or ITB may be provided as a prediction for the branch address. The operation of the system and method will be described for each of the four possible outcomes; for clarity, they are delineated as Cases 1 through 4.

In an exemplary embodiment of the present invention, if BTB 110 hits and ITB 120 misses (Case 1), a branch prediction unit prediction is provided from the BTB unless the predicted branch type is direct and the branch is predicted not to be taken. If BTB 110 predicts an instruction is a branch but will not be taken branch prediction unit 100 provides no prediction. For some indirect branch instructions BTB 110 may provide an adequate branch prediction; using ITB 120 only if necessary raises the efficiency of the branch prediction unit of the present invention while providing high accuracy. That BTB 110 hits indicates the instruction is predicted to be a branch. If the branch is predicted to be a direct branch, a prediction is provided by branch prediction unit 100 only if the history field indicates the branch is likely to be taken.

After the instruction is decoded the type of branch is known, and, if the branch is direct, the target address is known. If the branch is indirect, the target address is known after the instruction is executed. After the type and target is known it is known whether or not the prediction is correct. If the prediction is correct, no change is made either to BTB 110 or ITB 120.

On the occurrence of a BTB hit and an ITB miss (Case 1) where the prediction is incorrect and the branch is determined to be an indirect branch, an entry is allocated in ITB 120 and the BTB entry is unchanged. An ITB entry is allocated in this situation because it is assumed that since BTB 110 incorrectly predicted the indirect branch, ITB 120 may be more accurate in the future. The BTB entry is kept unchanged in this situation, as BTB 110 is used as a "gatekeeper", indicating whether or not an ITB hit is an indirect branch. Since BTB 110 uses more of the instruction address as an index and does not combine the address with the PIR, it is less likely to have a false hit than ITB 120; thus BTB 110 is used as a false hit filter for ITB 120. If the prediction is incorrect and the branch is direct, ITB 120 is not altered but BTB 110 is updated with the correct target address and branch outcome.

In an exemplary embodiment, on a BTB hit and ITB miss (Case 1) with an incorrect prediction for an indirect branch, an ITB entry is allocated. In an alternate embodiment, in this case, an ITB entry is allocated only if the BTB is incorrect by a certain measure. For example, an ITB entry may be allocated only when a 2 bit saturated counter associated with the corresponding BTB entry reaches a certain threshold. A BTB entry corresponds to an ITB entry if an instruction address causes a hit on both entries. Thus an ITB entry would not be created until the BTB had been wrong a certain number of times recorded by the counter, for example, two. In such a situation, where the 2 bit counter has weakly and strongly correct and incorrect states, the ITB is allocated if the counter is in the weakly or strongly incorrect states. Thus the relatively expensive ITB is not called into use for this particular branch (or PIR/branch address combination) until it is likely that the BTB is a poor predictor for this branch.

Note that the interaction between BTB 110 and ITB 120 is based on the assumption that for some indirect branches BTB 110 provides an adequate prediction mechanism, but for other indirect branches ITB 120 provides a more accurate prediction. Since ITB 120 may store multiple entries for any given branch, ITB 120 is more costly to implement on a per branch basis. Thus if BTB 110 provides an adequate prediction for a particular branch, it should be used instead of ITB 120. The first time an indirect branch is recorded by branch prediction unit 100 it is assumed that BTB 110 provides an adequate prediction. This assumption may be corrected by BTB 110 providing a wrong prediction. If an indirect branch is not in BTB 110 it is assumed that the indirect branch is not stored in ITB 120, as the indexing scheme used for BTB 110 provides a more accurate indication of whether a hit based on an IP actually corresponds to the instruction at that IP. In an exemplary embodiment, the indexing schemes for both BTB 110 and ITB 120 permit any given entry in each buffer to correspond to multiple instructions, as the indexes for the buffers are formed from only portions of the instruction addresses, and the ITB index is created from a combination of a portion of the addresses and PIR 130.

In an exemplary embodiment of the present invention, on the occurrence of a BTB hit and ITB hit (Case 2), if the branch type as predicted by BTB 110 is direct, the BTB prediction is provided as a branch prediction unit prediction if the branch is predicted to be taken. BTB 110 may be updated if there is a misprediction: if an instruction predicted to be a branch is not a branch; if an instruction predicted to be taken is not (or vine versa); or if a predicted target is wrong. If no entry exists in BTB 110 for an instruction which found to be a taken branch, an entry is allocated in BTB 110 for that instruction.

If, in Case 2, the branch type is predicted to be indirect, the ITB prediction overrides that of BTB 110 and is provided as a branch prediction unit prediction. In this situation, it is considered likely that ITB 120 is a better predictor of indirect branches than BTB 110, and BTB 110 is used merely to determine the type of branch. In an exemplary embodiment, if, after execution, it is determined that the ITB target is wrong, the ITB entry is updated but the BTB entry is not updated. BTB 110 is not updated because the prediction stored in BTB 110 is not necessarily a better prediction than that which is used to update ITB 120.

In an alternate embodiment, if the BTB prediction is wrong after a BTB hit on an indirect branch (whether or not ITB 120 hits), the BTB is updated. Furthermore, if both the BTB and ITB hit on an indirect branch, and the ITB prediction is correct, the ITB has the LRU counter for the relevant way updated to show the returned entry as least recently used only if the BTB prediction is wrong. If the BTB prediction is correct the LRU counter for the ITB entry is not updated, despite that a hit occurred on the ITB. Thus, if the BTB offers as good a prediction as the ITB, the ITB entry will eventually be evicted. The ITB should only contain entries if those entries are likely to offer a better prediction than the BTB.

In an exemplary embodiment, if BTB 110 misses and ITB 120 hits (Case 3), no prediction is given by branch prediction unit 100. Multiple addresses may map to the same ITB entry; only certain of these addresses are indirect branches. Due to the BTB indexing scheme, less instructions map to index to each BTB entry; thus a BTB miss indicates the instruction is not currently predicted as a branch. Furthermore, BTB entries provide a prediction of the branch type. BTB 110 is thus used as a gatekeeper, allowing an ITB prediction only if BTB 110 determines the instruction is likely to be a branch and that the branch is likely to be indirect. The combination of a BTB and ITB in the present invention improves accuracy, as ITB 120 is not allowed to provide inaccurate predictions. Using the BTB, which is less costly on a per-entry basis, to provide such information, improves efficiency.

In Case 3, if it is determined after the instruction is decoded and executed that the instruction is a branch which was taken, a new entry is allocated in BTB 110 for this instruction. The address of the instruction—the branch address—is allocated in BTB 110, but not ITB 120. If the instruction is a direct branch, ITB 120 is not updated. If the instruction is an indirect branch, the ITB entry is invalidated, as BTB 110 is assumed, at least initially, to provide a correct prediction. Since BTB 110 is less costly, if BTB 110 can provide a successful prediction for the indirect branch it is used instead of ITB 120. If it is later determined that the BTB prediction is wrong for this indirect branch, an entry will be allocated in ITB 120 (see above, in Case 1, where there is a BTB hit and mis-prediction and an ITB miss).

In an exemplary embodiment of the present invention, to invalidate an entry, the LRU counter for the line holding the entry is set to indicate that entry was the least recently used, and therefore it is the first to be overwritten when a new way is added to the line. Other methods may be used to invalidate an entry; for example the entry may be erased, and the LRU counter set accordingly to indicate that entry was the least recently used.

In an exemplary embodiment of the present invention, if both BTB 110 and ITB 120 miss (Case 4), no prediction is given by branch prediction unit 100. If, after the instruction is executed and decoded, it is determined that the instruction is a branch which was taken, a new entry is allocated in BTB 110 for this instruction. The address of the instruction—the branch address—is allocated in BTB 110, but not ITB 120. As with Case 3, where there is a BTB miss and an ITB hit, no entry is allocated in ITB 120. This is because BTB 110 may provide accurate predictions for some indirect branches, at a lower cost.

In alternate embodiments of the present invention different steps may be taken according to the contents of the BTB and ITB. For example, if both the BTB and ITB miss, the ITB may be allocated if it is later determined the instruction is an indirect branch. Alternate embodiments of the present invention may treat different types of branches in different manners.

Figure 5:
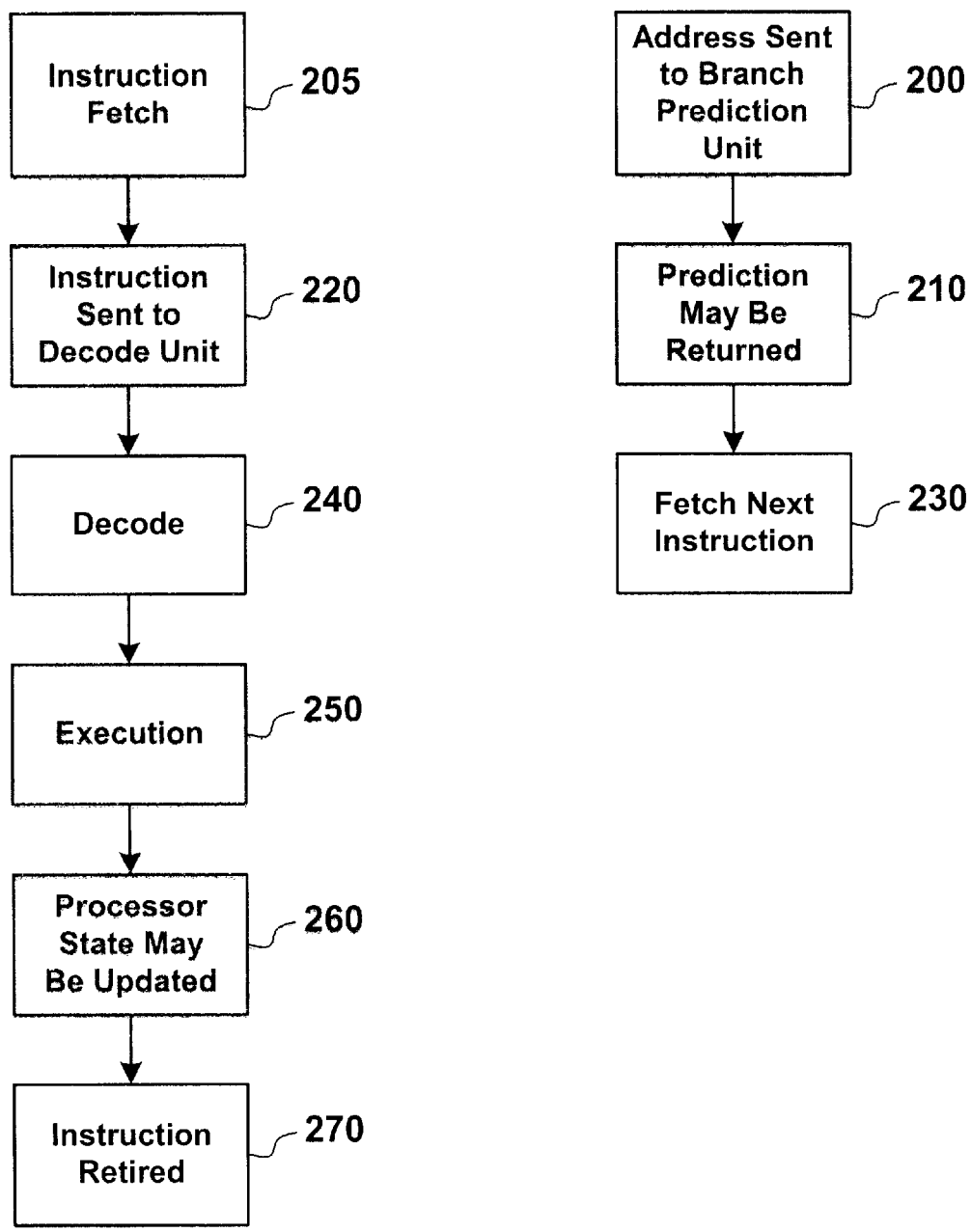
FIG. 5 is a flowchart describing the sequence of steps taken by the computer system of FIG. 1 according to an embodiment of the present invention.

FIG. 5 is a flowchart describing the sequence of steps taken by computer system 1 of FIG. 1 according to an embodiment of the present invention. Alternate embodiments of the present invention may function with microprocessors performing different steps or different sequences of steps.

Referring to FIG. 5, in step 200 fetch unit 25 sends the contents of IP register 60 to branch prediction unit 100.

In step 205 fetch unit 25 fetches the instruction corresponding to IP register 60 from memory interface unit 20 and increments IP register 60. To obtain the instruction, memory interface unit 20 accesses memory 10, or possibly a cache internal to memory interface unit 20, and sends the instruction to fetch unit 25.

In step 210, branch prediction unit 100 receives the instruction address from fetch unit 25 and may return a predicted target address based on this instruction address (step 230). If branch prediction unit 100 predicts a target, the target (an instruction address) is provided to fetch unit 25, which fetches the instruction at the target address. The predicted target address is the likely next instruction address. The IP for the instruction fetched in step 205, the instruction for which a prediction is predicted, is placed on IP stack 50. Branch prediction unit 100 returns its prediction, if any, before fetch unit 30 completes fetching the instruction (step 205).

In step 220, fetch unit 25 sends the instruction fetched in step 205 to decode unit 30 to be decoded.

In step 230, fetch unit 25 fetches the next instruction, which is either the instruction following the instruction fetched in step 205 (i.e., the next instruction in the instruction sequence) or a predicted branch target. If branch prediction unit 100 has provided a target address (step 210), IP register 60 is set to the target address, and the fetch is performed on this target. If branch prediction unit 100 has not provided a target, the address of the instruction to be fetched is the address subsequent to the instruction fetched in step 205. After fetching the next instruction or the predicted target, fetch unit 25 increments IP register 60.

In an exemplary embodiment, step 230, the fetch of the next instruction in the instruction sequence or predicted instruction, takes place substantially simultaneously as step 240, the decode of the instruction fetched in step 205.

In step 240 decode unit 30 decodes the instruction fetched in step 205 into micro-ops. Decoding the instruction provides a determination of whether or not the instruction is a branch, and the type of branch; decode unit 30 provides this information to branch prediction unit 100. Decode unit 30 sends the micro-ops to the appropriate instruction execution unit or units. If micro-ops involve a branch, they are sent to branch execution unit 42 for execution. If micro-ops do not involve a branch, they are sent to another of the appropriate execution units, for example an add execution unit. Information describing whether or not the instruction is a branch, the type of branch, and, in the case of a non-conditional direct branch, the target, are sent to branch prediction unit 100.

In step 250, the micro-ops constituting the instruction fetched in step 205 are executed by the appropriate execution units. If the instruction has been determined to be a branch, branch execution unit 42 executes the instruction micro-ops received from decode unit 30. After all the micro-ops for an instruction are executed the instruction is retired: all data resulting from the operation of the instruction is written to a register, or memory 10 (or a cache) via memory interface unit 20. After the instruction is executed the actual branch target address and whether the branch (if a conditional branch) was taken or not taken are known. Whether or not the instruction is a branch and the branch type are known after the decode phase. For an unconditional branch the taken status is known after the decode stage. The target for an unconditional direct branch is known after the decode stage. This information is provided to branch prediction unit 100.

Processor 1 executes instructions in-order; the decode stage for an instruction occurs substantially simultaneously with the fetch of the next instruction, and the execute stage for an instruction occurs substantially simultaneously with the decode of the next instruction. However, an exemplary embodiment of the present invention may be used with processors having out of order processing; for example, the execute stage for the several micro-ops which constitute a particular instruction may occur out of sequence relative to that for micro-ops for other instructions.

The present invention may function with processors other than that described. For example, the present invention may function with a processor having a different set of pipeline stages, or an out-of-order processor.

In step 260, branch prediction unit 100 compares the information received from decode unit 30 and branch execution unit 42 with the prediction for the instruction fetched in step 205 and may update or correct the state of processor 1. Branch prediction unit 100 may update PIR 130, BTB 110 and ITB 120 of branch prediction unit 100, and on a misprediction may update IP register 60 and flush the instruction pipeline. Step 261) may take place in response to information sent by decode unit 30 or branch execution unit 42. If branch prediction unit 100 generates a misprediction, there is a resulting inefficiency. This inefficiency is lowered the quicker the misprediction is corrected. Thus step 260 may take place immediately after step 240 (decode) or step 250 (execute).

In step 260, if a target was predicted for the instruction, the instruction was a branch which was taken (i.e., did not fall through), and the target address differs from that which was predicted by branch prediction unit 100, the processor state is adjusted accordingly. Branch prediction unit 100 sends the correct branch target address to fetch unit 25, which updates IP register 60 with the target address, fetches the target address, and increments the IP in IP register 60. The IP of the branch instruction is popped off IP stack 50 and discarded. The mispredicted instruction and each instruction subsequent to the misprediction must be flushed from the pipeline. Fetch unit 25 and execution units 40–42, which are processing instructions fetched as a result of the misprediction, are directed by branch prediction unit 100 to ignore these instructions. Fetch unit 25 is not actually flushed, but is instead instructed to fetch the correct instruction; this instruction passes through the pipeline. Such a flush operation is expensive in terms of processor efficiency, and the present invention reduces the occurrence of such flush operations while using a minimum of resources.

In step 260, if a target was predicted for the instruction fetched in step 205, and no branch occurred for the instruction (either the instruction was not a branch or the instruction was a branch but fell through), the IP corresponding to this instruction is popped off IP stack 50, incremented, and sent to fetch unit 25. Fetch unit 25 places this current IP in IP register 60, fetches the corresponding instruction, and increments the IP. The corresponding instruction is the instruction subsequent to the instruction fetched in step 205 for which a misprediction was made. The pipeline is flushed.

If a target was predicted by branch prediction unit 100 for the instruction fetched in step 205, and after decoding or execution it is determined that the branch target address is the same as that predicted, processor 1 continues with the predicted instruction in the pipeline. The IP of the branch instruction is popped off IP stack 50 and discarded, and the pipeline is not flushed.

If no target was predicted for the instruction, and after the decode and execute steps it is determined the instruction is a branch, processor 1 changes the execution sequence as per the branch instruction and the pipeline is flushed. The branch, if taken, may be entered in the registers and buffers of branch prediction unit 100.

If no target was predicted by branch prediction unit 100 for the instruction fetched instep 205, and the instruction is not a branch, no change to IP register 60 or IP stack 50 needs to take place, no instruction address is sent to fetch unit 25, the pipeline is not flushed, and no correction is made to branch prediction unit 100 registers or buffer.

In step 270, the instruction executed in step 250 is retired. Any operands affected by the execution of the instruction are written to a register or memory 10 (or a cache) via memory interface unit 20. Any instructions which are executed as the result of a branch predicted by branch prediction unit 100 are not retired until the predicted branch instruction is resolved and it is determined that the prediction is correct. Instructions which are flushed from the pipeline are never retired.

Figure 6:
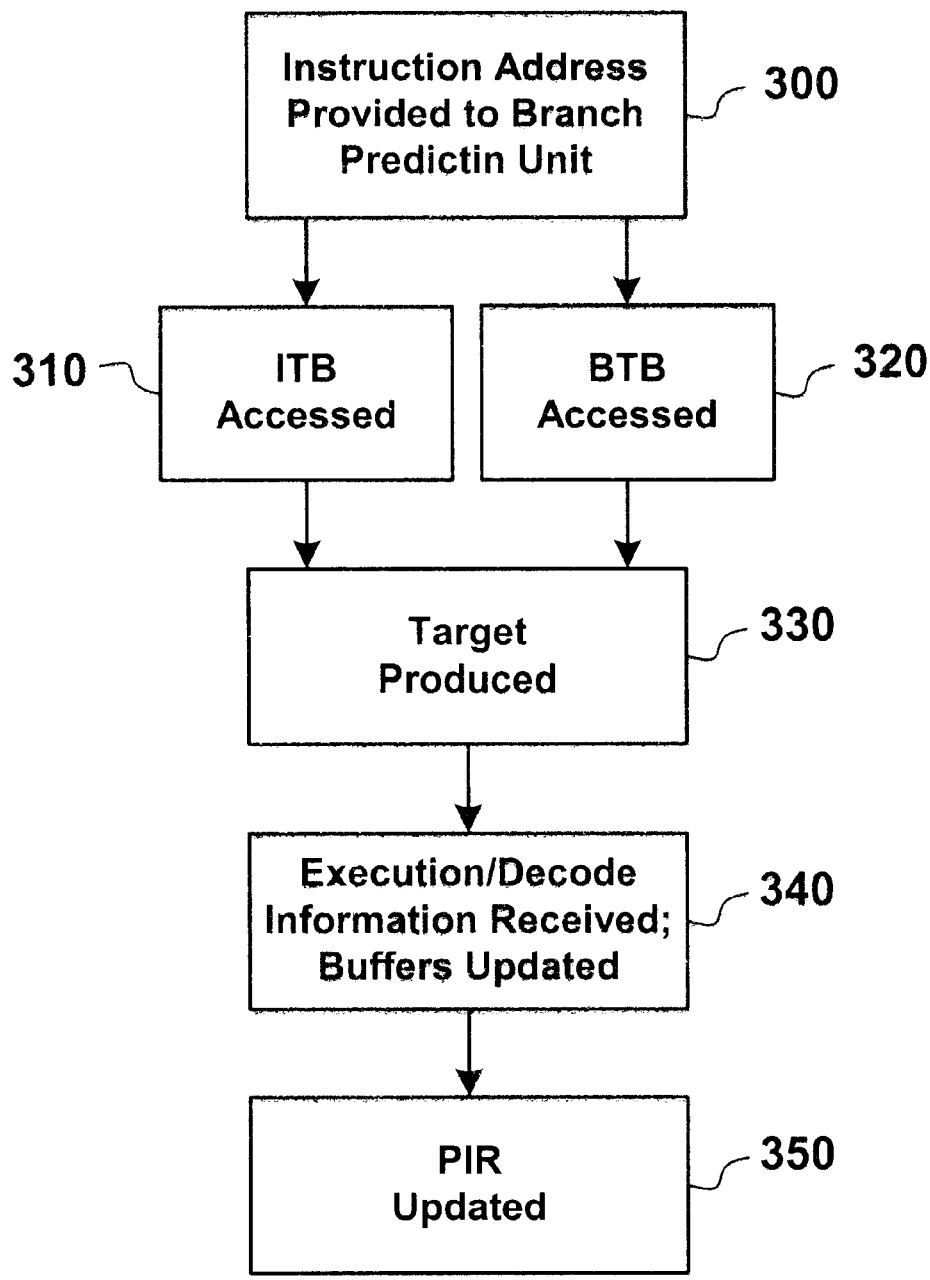
FIG. 6 is a flowchart describing the sequence of steps taken by the branch prediction unit of FIG. 1 according to an embodiment of the present invention.

FIG. 6 is a flowchart describing the sequence of steps taken by branch prediction unit 100 of FIG. 1 according to an embodiment of the present invention.

Referring to FIG. 6, in step 300, the instruction address of an instruction for which a prediction is to be made is provided to branch prediction unit 100 by fetch unit 25, which maintains IP register 60. Branch prediction unit 100 accesses ITB 120 (step 310) and BTB 110 (step 320) substantially simultaneously.

The instruction address provided may or may not be that of a branch instruction, and a prediction may or may not be provided by branch prediction unit 100. At times, branch prediction unit 100 may provide a prediction for an instruction which is not a branch; such a prediction is incorrect. However, the system and method of the present invention is indented to correctly predict the targets of branch instructions (and not to provide incorrect predictions for branch and non-branch instructions) while,, making efficient use of processor resources.

In step 310 branch prediction unit 100 uses the instruction address to access ITB 120. The 16 LSB of the instruction address provided to branch prediction unit 100 is XORed with the 16 bit PIR 130 to provide a result. The 7 LSB of the result are used to index a line in ITB 120. Branch prediction unit 100 attempts to match the 9 MSB of the result to a tag associated with one of the 4 ways in the line.

If no tag matches the 9 MSB, a miss occurs and no ITB result is produced.

If one of the tags match the 9 MSB, a hit occurs and the 32 bit target address associated with the tag is produced to branch prediction unit 100 as a result. The LRU counter for that line is updated so that the way selected is denoted as least recently used. In an exemplary embodiment, for both BTB 110 and ITB 120, the LRU counter for a given line is updated whenever a hit occurs, regardless of the ultimate correctness or use of the prediction. Other embodiments may update or not update the LRU counter based on the correctness of the prediction, the type of branch, which combination of BTB 110 and ITB 120 hit, or other information.

In step 320 branch prediction unit 100 uses the 9 LSB of the 32 bit instruction address provided to branch prediction unit 100 to access BTB 110. Branch prediction unit 100 attempts to match the 9 bits of the address higher than the 9 LSB to one of the tags associated with each of the 4 ways in the line. If none of the tags match the 9 bits, a miss occurs and no result is produced. If one of the tags match the 9 bits, a hit occurs and the 32 bit target address associated with the tag is produced to branch prediction unit 100 as a result, along with the type of branch and a history field. If a hit occurs the LRU counter for that line is updated to indicate the new order in which the ways for the line have been accessed.

In step 330, branch prediction unit 100 may produce a predicted target to fetch unit 25. Note that if a BTB hit occurs, no branch prediction is made if the branch is predicted as not Liken. The specific method of producing a target for an exemplary embodiment of the present invention is discussed above and is summarized in Table 1. Alternate embodiments may produce predictions in a different manner. The BTB Entry Branch Type is the branch type as predicted by BTB 110.

TABLE 1

| Case | BTB | ITB | BTB Entry Branch Type (Predicted Result) | Predicted Target Produced |
|---|---|---|---|---|
| 1 | Hit | Miss | Direct (taken); Indirect | BTB Result |
| 1 | Hit | Miss | Direct (not taken) | None |
| 2 | Hit | Hit | Direct (taken) | BTB Result |
| 2 | Hit | Hit | Direct (not taken) | None |
| 2 | Hit | Hit | Indirect | ITB Result |
| 3 | Miss | Hit | Direct or Indirect | None |
| 4 | Miss | Miss | Direct or Indirect | None |

In step 340, information on the instruction for which a prediction was requested is received by branch prediction unit 100 from instruction decode unit 30 and/or branch execution unit 42, and BTB 110 and ITB 120 may be updated. Since, the decode step rather than the execution step may provide information sufficient to update the information in branch prediction unit 100, if necessary, steps 340–350 may take place at any time after the instruction predicted is decoded.

Branch prediction unit 100 receives from decode unit 30 and branch execution unit 42 the instruction type (branch or non-branch), and if applicable the branch type, the actual branch target address and whether the branch was taken. Based on this information branch prediction unit 100 may update or allocate an entry in ITB 120 and/or BTB 110. An update may be performed if the prediction produced in step 330 was in error or if no prediction was given but a new entry is to be created. Note that the LRU counters for BTB 110 and ITB 120 are updated if a hit is detected (steps 310 and 320), and do not have to be updated in step 340 unless an allocation (i.e., new entry) is made or it is desired that an entry should be invalidated.

If a prediction was produced in step 330, branch prediction unit 100 in step 340 compares the prediction to the received information, and an entry (way) may be allocated (added) or changed or invalidated in BTB 110 or ITB 120. The entry or entries to be changed or invalidated correspond to those used for the prediction given in step 330, and are indexed accordingly using the branch instruction address and (in the case of ITB 120) PIR 130. A new BTB or ITB entry has the LRU counter for the line holding the entry updated to indicate the entry was the last accessed.

If a prediction was not produced in step 330 due to BTB 110 erroneously predicting that a branch would not be taken, the relevant BTB entry is updated.

The predictions returned and whether or not an allocation, update or invalidation is performed for BTB 110 and ITB 120, according to an exemplary embodiment, are summarized in Table 2. Alternate embodiments may produce predictions and may allocate the various buffers in different manners.

In step 350, the PIR may be updated. In an exemplary embodiment, if the instruction for which a prediction was provided in step 330 is determined in step 340 to be a direct branch or an indirect branch, branch prediction unit 100 updates PIR 130. Alternate embodiments may update the path history on the occurrence of other sets of branches or events, such as only on the occurrence of direct branches.

In an exemplary embodiment, to recompute PIR 130, the 16 bit PIR is XORed with the 16 LSB i)f the branch address, if the branch was direct, or the 16 LSB of the target address, if the branch was indirect, to produce a 16 bit result. The result is shifted left one bit, and the rightmost bit is set to 0 if the branch is not taken and 1 if the branch is taken (in an exemplary embodiment indirect branches are always taken). This becomes the recomputed PIR 130. The formula for recomputing an n bit PIR can be described as:

$$(((PIR \oplus \text{branch\_address\_portion}) << 1) \& (2^n - 1) | \text{branch\_outcome}$$

where branch_address_portion is the n LSB of the branch instruction IP or target address IP and branch_outcome is 0 if the branch is not taken and 1 if the branch is taken.

Alternate embodiments of the system and method of the present invention may operate in a different manner than just described. For example, in other embodiments, the PIR may be updated in a different manner, and the PIR update formula may thus be expressed more generally as:

$$((\Phi(PIR, \text{Branch\_address}) << \text{Aging\_shift\_count}) \& \text{Mask}) | \text{Fill\_bits}$$

where Branch_address is the IP of the branch instruction, $\Phi$ is some function of the PIR and the branch address or target address (for instance XOR), Aging_shift_count is an integer (for instance 1), Mask is any n-bit mask (for instance $2^n - 1$, where n is the length in bits of the PIR), and fill_bits may be any function. For example, an embodiment where the PIR is updated only when indirect branches occur, fill_bits may be a string of 1's on the occurrence of an indirect branch. The present invention is not restricted to using the specific formula described above for the PIR. Furthermore, the components defining the PIR function are not restricted to those described above. For example, $\Phi$ may be an OR function, Aging_shift_count may be 2, Mask may be $2^{(n-1)} - 1$, and Fill_bits may be a portion of the target address. Branch_address may be an address other than the address of the branch instruction, for example the target address.

Embodiments of the system and method of the present invention may prevent ITB (or BTB) entries from being created for branches which are inherently unpredictable.

TABLE 2

| BTB/ITB (Hit or Miss) | BTB Entry Predicted Branch Type (Result) | Predicted Target Returned | Prediction Correct? | Allocation/ Update (per result) |
|---|---|---|---|---|
| Hit/Miss | Direct or Indirect | BTB Result | Yes | None |
| Hit/Miss | Direct (Taken) | BTB Result | No | BTB Updated |
| Hit/Miss | Direct (Not Taken) | None | No | BTB Updated |
| Hit/Miss | Indirect | BTB Result | No | ITB Allocated |
| Hit/Hit | Direct (Taken) | BTB Result | Yes | None |
| Hit/Hit | Direct (Not Taken) | None | Yes | None |
| HIt/Hit | Indirect | ITB Result | Yes | None |
| Hit/Hit | Direct (Taken) | BTB Result | No | BTB Updated |
| Hit/Hit | Direct (Not Taken) | None | No | BTB Updated |
| Hit/Hit | Indirect | ITB Result | No | ITB Updated |
| Miss/Hit | None | None | N/A | Indirect: BTB Allocated/ ITB Invalidated Direct Taken: BTB Allocated Direct Not Taken: None |
| Miss/Miss | Indirect or Direct | None | N/A | Taken: BTB Allocated Not Taken: None |

Since the ITB is relatively expensive to implement, indirect branches for which predictions may not be made reliably should not be entered into the ITB. Embodiments of the present invention can prevent information on such branches from being placed in the ITB in various ways.

For instance, it may be possible to determine at compile time which branches are inherently unstable. When the compiler identifies such branches, an indication may be placed in the object code that this branch should not be placed in the ITB. When an instruction bearing such an indication is fetched, the branch prediction unit is passed this indication, and does not allocate entries in the ITB. One method for a compiler to identify such unstable branches is to run the object code after compilation and profile each branch instruction; in such a way those branch instructions which are inherently unstable may be identified and marked.

Another method for detecting unpredictable branches may utilize a counter in the BTB which provides an indication of the number of times an ITB prediction has been correct or incorrect for a particular branch. For instance, when an indirect branch is allocated in the BTB a counter may be added to the entry and set to the maximum number for that counter. Each ITB misprediction for this entry results in the counter in the BTB entry being decremented, and each correct ITB prediction results in the counter being incremented. If the counter reaches zero (indicating a certain number of ITB mispredictions relative to accurate predictions), no new ITB entries for this branch are allocated. In addition, existing ITB entries for this branch may be ignored, resulting the eventual replacement of these entries.

In one embodiment the counter is a two bit counter allowing for four mispredictions before an ITB entry is no longer used.

In embodiments described above the BTB and ITB have a master/slave relationship, where the BTB acts as a gatekeeper for the ITB (as it stores more information on a branch than the ITB) and has its predictions override that of the ITB (as it is less costly to implement). Other embodiments may provide that the BTB and ITB are on a more equal footing. Which method is used may depend on the particular type of source code used with the system and method of the present invention. In such embodiment, where there is a BTB hit and an ITB miss (Case 1), and a misprediction is provided on an indirect branch, an entry is allocated in the ITB and the mispredictive entry is invalidated in the BTB. In this embodiment, where there is a BTB miss and an ITB hit (Case 3), and the branch is predicted to be indirect, the ITB entry is used as a prediction and a new entry is not allocated in the BTB.

IV. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

Alternate embodiments may use different combinations of buffers for a branch prediction unit. A BTB and ITB having a particular structure need not be used, and the ITB may be combined with more than one other buffer. The ITB may be used with any other predictive cache mechanism; a BTB need not be used. The system and method of the present invention does not require a buffer in addition to the ITB; the ITB alone may be used. Alternate embodiments may allow for different interactions between the ITB and other buffers of the branch prediction unit.

Alternate embodiments may use different methods and systems of indexing the various buffers of the branch prediction unit. Such methods and systems may include PIRs having different structures, which are updated on different events.

Alternate embodiments may involve various implementations of the branch prediction unit; for example, the functions of the branch prediction unit may be distributed among different units within a processor. Alternate embodiments may allocate entries in the buffers and produce predictions from the buffers in different manners. Other embodiments of the present invention may treat different types of branches in different manners. The present invention may function with microprocessors having different steps or different sequences of steps.

What is claimed is:

1. A system for predicting a branch target for a current branch instruction having a branch address in a processor, the system comprising:

a register holding a current register value, where at least a portion of the current register value is formed from a first computation, the first computation comprising an XOR operation on a previous register value and a set of bits from a previous branch address; and a first table storing branch target values, the first table indexed by a result of a second computation on the current register value and the branch address of the current branch instruction; and a second table storing branch target values for indirect branches and branch target values for direct branches, where the first table stores branch target values for indirect branches.

2. The system of claim 1 where:

the second table is a branch target buffer; and the second table is indexed by a portion of the branch address of the current branch instruction.

3. The system of claim 1 where:

the second table either provides a second table prediction and a type prediction for the current branch instruction or returns a second table miss;

the first table either provides a first table prediction for the current branch instruction or returns a first table miss; and if, for the current branch instruction, a second table prediction is provided, a first table prediction is provided, and the type prediction is indirect, the system forms a branch target prediction from the contents of the first table.

4. The system of claim 1 where:

the first computation further comprises a shift left one bit operation and an OR operation, where one operand of the OR operation is 0 if the previous branch address is for a first type of branch and 1 if the previous branch address is for a second type of branch; and an entry from the first table is returned as a prediction only if a second table hit occurs.

5. A system for predicting a branch target for a current branch instruction having a branch address in a processor, the system comprising:

a register holding a current register value, where at least a portion of the current register value is formed from a first computation, the first computation comprising a first operation on a previous register value, a shift left operation, an OR operation, and a set of bits from a previous branch address; and a first table storing branch target values, the first table indexed by a result of a second computation on the current register value and the branch address of the current branch instruction.

6. The system of claim 5 where:
the first table is a cache;
the shift left operation shifts left one bit;
one operand of the OR operation is 0 if the previous branch address is for a first type of branch and 1 if the previous branch address is for a second type of branch.

7. The system of claim 6 where:
each branch target value corresponds to an indirect branch.

8. A system for predicting a branch target for a current branch instruction having a branch address in a processor, the system comprising:
a register holding a current register value, where at least a portion of the current register value is formed from a first computation, the first computation comprising an XOR operation on a previous register value and a set of bits from a previous branch address;
a first table storing branch target values, the first table indexed by a result of a second computation on the current register value and the branch address of the current branch instruction; and
a second table having a plurality of entries, each entry storing a branch target value for a branch and a second table entry error counter, the second table entry error counter being recalculated when the second table entry provides a prediction; where:
the first table comprises a plurality of entries, each entry storing a branch target value for an indirect branch;
if, for a second table entry, the second table error counter reaches a certain value, a first table entry corresponding to the second table entry is created; and
an entry from the first table is returned as a prediction only if, second table hit occurs.

9. A method for providing a predicted branch target for a current branch instruction, the current branch instruction having on address, the method comprising:
placing in a register the result of a first calculation, including an XOR operation, a shift left operation, and an OR operation, on the register and a set of bits from an address of a completed branch instruction;
creating an index by performing a second calculation on the register and a set of bits from the address of the current branch instruction; and
using the index to find a target address for the second branch address in a first table, where the first table either provides a first table prediction for the current branch instruction or returns a first table miss.

10. The method of claim 9 where:
each of a subset of the target addresses corresponds to an indirect branch.

11. The method of claim 10 further comprising accessing a second table, where:
the second table comprises a plurality of second table entries; and
the first table comprises a plurality of first table entries, each first table entry being capable of providing a prediction, each first table entry in a subset of the first table entries corresponding to a second table entry.

12. The method of claim 11 where each second table entry comprises a second table prediction and a second table error counter, the second table error counter being recalculated when the second table entry provides a prediction, the method further comprising:
if, for a second table entry, the second table error counter reaches a certain value, a first table entry corresponding to the second table entry is created.

13. The method of claim 9 further comprising:
creating a second table index from a calculation on the current branch instruction address; and
using the second table index to access a second table.

14. The method of claim 13 where the second table is a branch target buffer.

15. The method of claim 14 where the second table is a cache and the first calculation occurs as a result of an indirect branch or a direct branch.

16. A method for providing a predicted branch target for a current branch instruction, the current branch instruction having an address, the method comprising:
placing in a register the result of a first calculation on the register and a set of bits from an address of a completed branch instruction;
creating an index by performing a second calculation on the register and a set of bits from the address of the current branch instruction;
using the index to find a target address for the second branch address in a first table, where the first table either provides a first table prediction for the current branch instruction or returns a first table miss;
accessing a second table to either provide a second table prediction and a type prediction for the current branch instruction or return a second table miss, the type prediction being a first type or a second type; and
if, for the current branch instruction, a second table prediction is provided, a first table prediction is provided, and the type prediction is a first type, forming a branch target prediction from the contents of the first table.

17. The method of claim 16 where:
the first table is a cache;
the second table is a cache;
the first type corresponds to an indirect branch; and
the second type corresponds to a direct branch.

18. A method for providing a predicted branch target for a current branch instruction, the current branch instruction having an address, the method comprising:
placing in a register the result of a first calculation on the register and a set of bits from an address of a completed branch instruction;
creating an index by performing a second calculation on the register and a set of bits from the address of the current branch instruction; and
using the index to find a target address for the second branch address in a first table, where the first table either provides a first table prediction for the current branch instruction or returns a first table miss and where the first table prediction is correct or incorrect;
accessing a second table to either provide a second table prediction and a type prediction for the current branch instruction or return a second table miss, the type prediction being a first type or a second type, the second table prediction being correct or incorrect; and
if a second table prediction is provided and a first table prediction is provided, if the type prediction is a first type providing as a branch prediction the first table prediction and if the type prediction is a second type providing as a branch prediction the second table prediction.

19. The method of claim 18 where:

the first type corresponds to an indirect branch; and if a second table prediction is provided, if the type of the current branch instruction is of the first type, and the second table prediction is incorrect, the second table entry is corrected.

20. The method of claim 19 where:

each target address is associated with an LRU counter;

if a second table prediction is provided, a first table prediction comprising a target address is provided, the type of the current branch instruction is of the first type, the second table prediction is incorrect, and the first table prediction is correct, the LRU associated with the target address is updated to indicate the associated target address is most recently used.

21. The method of claim 18 where the first table is a cache and the second table is a cache.

22. A method for providing a predicted branch target for a current branch instruction, the current branch instruction having an address, the method comprising:

placing in a register the result of a first calculation on the register and a set of bits from an address of a completed branch instruction;

creating an index by performing a second calculation on the register and a set of bits from the address of the current branch instruction;

using the index to find a target address for the second branch address in a first table, where the first table either provides a first table prediction for the current branch instruction or returns a first table miss; and accessing a second table to either provide a second table prediction and a type prediction for the current branch instruction or return a second table miss, the type prediction being a first type or a second type; and if the type prediction is of a first type, and a first table prediction is provided, the first table prediction is provided as a branch prediction;

if a second table miss is returned and a first table prediction is provided, the first table prediction is provided as a branch prediction;

if the type prediction is of a second type, a second table prediction is provided.

23. A system for predicting a branch target for a current branch address comprising:

an instruction cache;

an instruction decode unit;

an instruction fetch unit:

a register storing a history value, the history value computed from the XOR operation of the history value and a set of bits from a previous branch address, a shift of the history value, and an OR operation with a set of bits; and a first cache holding branch target addresses for indirect branches, the first cache accessed by an index, the index being a set of bits from the result of an XOR operation of the history value and the current branch address.

24. The system of claim 23 further comprising:

a second cache, the second cache storing a set of branch target addresses, the second cache being indexed by a set of bits of the current branch address.

* * * * *